United States Patent [19]

Sato et al.

[11] Patent Number: 4,480,876
[45] Date of Patent: Nov. 6, 1984

[54] ANTILOCK BRAKING SYSTEM

[75] Inventors: Makoto Sato, Kamifukuoka; Yoshitaka Miyakawa, Kawagoe; Etsuo Fujii, Wako; Shohei Matsuda, Ooi, all of Japan

[73] Assignee: Honda Giken Kogyo Kabushiki Kaisha, Tokyo, Japan

[21] Appl. No.: 387,549

[22] Filed: Jun. 11, 1982

[30] Foreign Application Priority Data

Jun. 27, 1981 [JP] Japan .................................. 56-100197

[51] Int. Cl.³ .............................................. B60T 8/10
[52] U.S. Cl. ................................ 303/103; 188/181 C; 303/111
[58] Field of Search ..................... 188/181 C; 303/103, 303/105, 106, 110, 111, 113

[56] References Cited

U.S. PATENT DOCUMENTS

| | | | |
|---|---|---|---|
| 3,493,271 | 2/1970 | Douglas | 188/181 C X |
| 3,764,182 | 10/1973 | Andreyko et al. | 188/181 C X |
| 3,972,568 | 8/1976 | Fleischer | 303/111 X |
| 4,288,127 | 9/1981 | Leiber et al. | 303/111 |
| 4,374,421 | 2/1983 | Leiber | 303/111 X |

Primary Examiner—Duane A. Reger
Attorney, Agent, or Firm—Posnack, Roberts, Cohen, & Spiecens

[57] ABSTRACT

An antilock braking system and associated method for a four wheel automotive vehicle having front left and right wheels and rear left and right wheels with a determined weight distribution of the vehicle on the front and rear wheels, each wheel having a respective brake cylinder adapted for applying braking pressure to the wheel in response to pressure fluid supplied from a master cylinder. The supply of pressure fluid from the master cylinder to the brake cylinders during a braking operation is controlled in accordance with the weight distribution of the vehicle on the wheels to enable the front and rear wheels normally to undergo incipient wheel slip at substantially the same time. A fluid pressure regulating unit relieves the fluid pressure transmitted to the respective brake cylinders of the four wheels of the vehicle all at the same time when one of the two front wheels rotates at a higher circumferential speed than the other front wheel and indicates incipient wheel slip.

9 Claims, 2 Drawing Figures

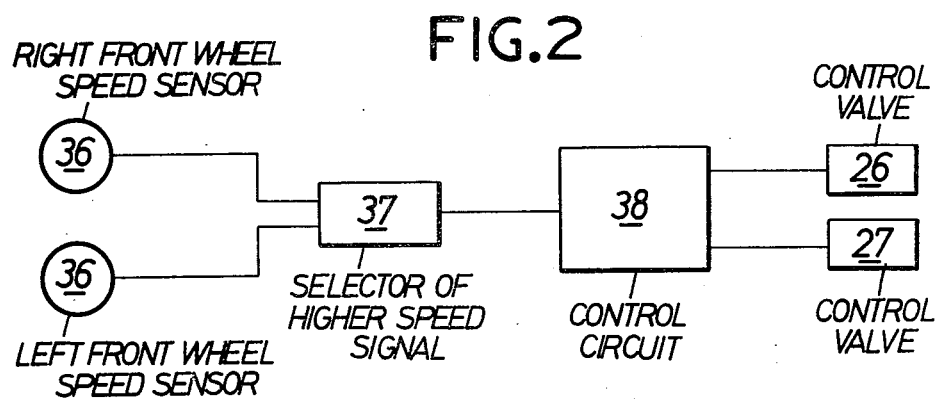

ANTILOCK BRAKING SYSTEM

FIELD OF THE INVENTION

This invention relates to antilock braking systems and associated methods for use on a four-wheeled automotive vehicle which are adapted to suppress or relieve hydraulic fluid pressures transmitted to respective wheel cylinders associated with the four, front and rear wheels, of the vehicle all at the same time when one of the two front wheels, rotating at a higher circumferential speed than the other front wheel, indicates incipient wheel slip while, on the other hand, adjusting the brake force distribution between the front and rear wheels in accordance with the load distribution therebetween.

PRIOR ART

So-called antilock control circuit devices have been developed and are in use to temporarily relieve the braking force when the force increases to a value such that any one of the wheels of the vehicle comes to indicate incipient wheel slip or is in a state ready to slip and subsequently, as soon as such wheel state is abated, to allow the braking force to be restored to its former level.

As is well known with automotive vehicles, the magnitude of load on any one of the wheels of the vehicle is variable according to different conditions, such as the loaded state of the vehicle itself, the condition of the road surface and the travel conditions of the vehicle. This means that the optimum magnitude of the brake force on each of the vehicle wheels should vary in accordance with such vehicle and road conditions. Ideally speaking, therefore, it is desirable that antilock control be effected for each of the vehicle wheels independently of one another. In practice, however, particularly with four-wheeled or other automotive vehicles having a relatively large number of road wheels, it is not alwarys desirable to provide independent antilock control for each of the wheels as this involves disadvantages, such as structural complexity of the braking system and hence its increase in weight and cost of fabrication.

On the other hand, as with the case of a front-engine front-drive automobile. the proportion of the vehicle weight carried by the two front wheels is often larger than that carried by the rear wheels. In such cases where the front and rear wheels are differently loaded, the brake forces applied to the front wheels should be different in magnitude from those applied to the rear wheels.

SUMMARY OF THE INVENTION

Under these circumstances, the present invention has for its primary object the provision of an antilock braking system and associated method for a four-wheeled automotive vehicle which is capable of effecting antilock control of all the four wheels of the vehicle with a simple hydraulic circuit construction adapted to vehicle performance including brake efficiency, directional stability and steerability.

According to the present invention, there is provided an antilock braking system for a four-wheeled automotive vehicle which comprises fluid pressure control valve means for controlling the ratio of the hydraulic fluid pressures transmitted to the front and rear wheel cylinders on either side of the vehicle in accordance with the load distribution between the front and rear wheels to enable the front and rear wheels normally to undergo incipient wheel slip at substantially the same time, i.e. at instants minimally spaced from each other, and hydraulic fluid pressure regulating means for relieving the hydraulic fluid pressure transmitted to the respective wheel cylinders associated with the four wheels of the vehicle all at the same time in response to control fluid pressure from an antilock control circuit in the braking system when one of the two front wheels rotates at a higher circumferential speed than the other front wheel and indicates incipient wheel slip.

In a dual hydraulic circuit of the antilock braking system of the character described, which includes a first hydraulic circuit arranged to supply hydraulic fluid pressure to one of the two front wheel cylinders and one of the two rear wheel cylinders and a second hydraulic circuit arranged to supply hydraulic fluid pressure to the other front wheel cylinder and the other rear wheel cylinder, the fluid pressure control valve means includes a pair of fluid pressure control valves respectively arranged in the first and second hydraulic circuits.

According to a specific feature of the present invention, in a dual hydraulic circuit of the antilock braking system of the character described, the hydraulic fluid pressure regulating unit includes a first, secondary hydraulic fluid pressure chamber arranged to receive primary hydraulic fluid pressure as transmitted from the brake master cylinder through the first hydraulic circuit to produce a secondary hydraulic fluid pressure proportional to the primary hydraulic fluid pressure, a second, secondary hydraulic fluid pressure chamber arranged to receive the primary hydraulic fluid pressure as transmitted from the brake master cylinder through the second hydraulic circuit to produce a secondary hydraulic fluid pressure proportional to the primary hydraulic fluid pressure, and an antilock control fluid pressure chamber arranged to allow both the first and second secondary hydraulic fluid pressure chambers to contract freely to produce the secondary hydraulic fluid pressure as long as said one of the two front wheels indicates no incipient wheel slip and to act in response to the antilock control fluid pressure to expand both the first and second secondary hydraulic fluid pressure chambers as soon as said one of the two front wheels indicates incipient wheel slip.

In further accordance with the invention, there is provided an antilock braking method which comprises controlling the supply of pressure fluid from the master cylinder to the brake cylinders of the wheels during a braking operation in accordance with the weight distribution of the vehicle on the wheels to enable the front and rear wheels normally to undergo incipient wheel slip at substantially the same time and relieving the fluid pressures transmitted to the respective brake cylinders associated with the four wheels of the vehicle all at the same time when one of the two front wheels rotates at a higher circumferential speed than the other front wheel and indicates incipient wheel slip.

In further accordance with the method, the fluid pressure is supplied from the master cylinder to the brake cylinders of the wheels along a first path to the brake cylinder of one of the front wheels and to the brake cylinder of one of the rear wheels and along a second path to the brake cylinder of the other front wheel and the brake cylinder of the other rear wheel. The fluid pressures are selectively relieved by applying pressure from a second fluid source to a regulating unit when one of the two front wheels rotates at a higher circumferential speed then the other front wheel and indicates incipient wheel slip.

Description will next be made of a preferred embodiment of the present invention as applied to a four-wheeled automotive vehicle of the type in which the two front wheels are normally more heavily loaded relative to the two rear wheels, with reference to the accompanying drawing.

BRIEF DESCRIPTION OF THE VIEWS OF THE DRAWING

FIG. 2 is a signal flow diagram for the antilock control circuit shown in FIG. 1.

DESCRIPTION OF THE PREFERRED EMBODIMENT

Figure 1:
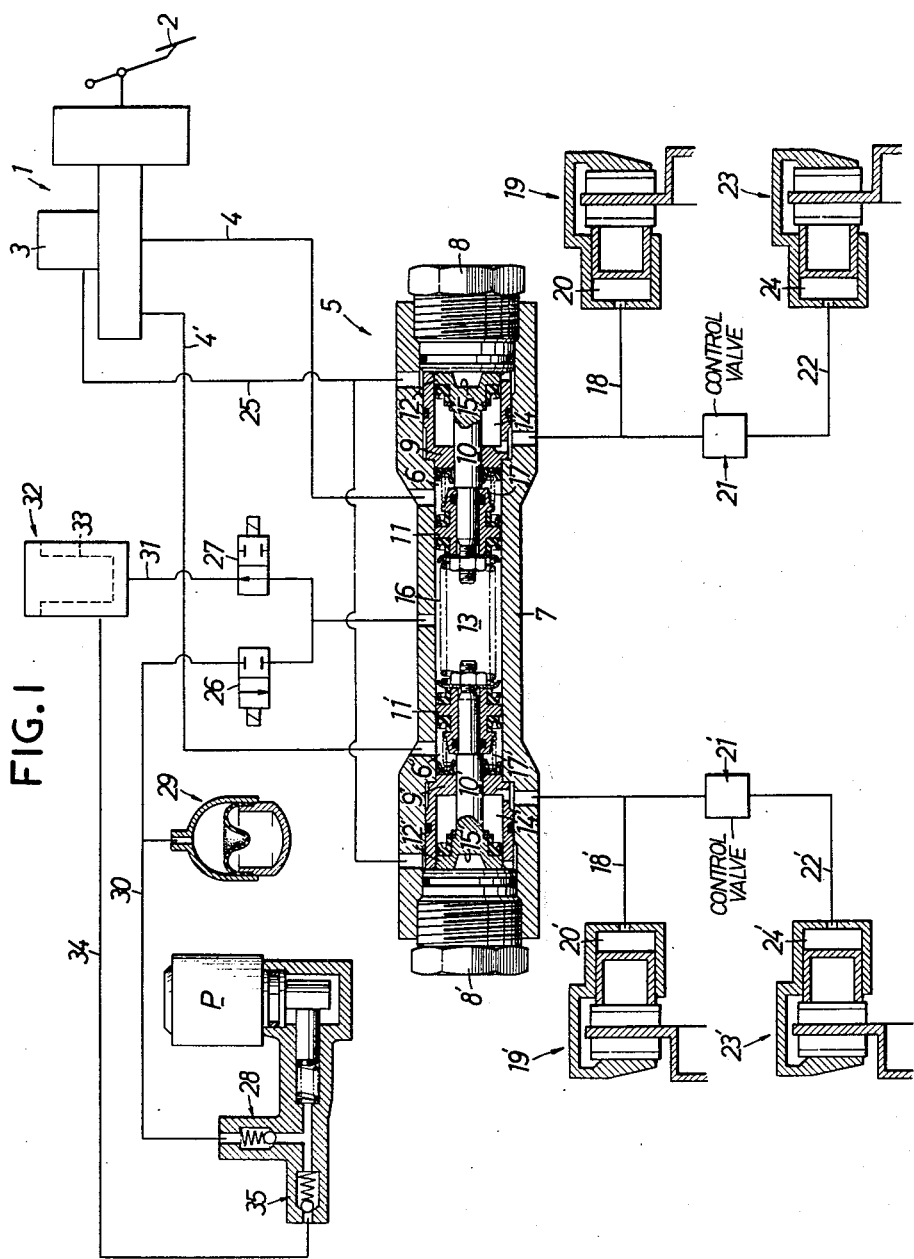
FIG. 1 diagrammatically illustrates a hydraulic fluid circuit, partly in section, of an antilock braking system embodying the principles of the invention.

Referring first to FIG. 1, a tandem type brake master cylinder 1 is filled with brake fluid from a reservoir 3 thereon and, upon depression of a brake pedal 2, produces a primary hydraulic fluid pressure which is directed to a pair of primary hydraulic fluid pressure chambers 6 and 6' defined in a hydraulic fluid pressure regulating unit 5 through a pair of fluid lines 4 and 4' respectively forming part of two independent hydraulic circuits of the braking system illustrated.

The hydraulic fluid pressure regulating unit 5 includes a cylinder 7 closed at opposite ends by a pair of end wall members 8 and 8', a pair of partition walls 9 and 9' arranged in the cylinder 7 at locations spaced from the respective end wall members 8 and 8', and a pair of piston rods 10 and 10' extending axially through the respective partition walls 9, 9' for sliding movement relative thereto. Each of the piston rods 10, 10' carries at the inner and outer ends thereof a respective pair of pistons 11, 12 and 11', 12'. Chamber 6 is defined between the partition wall 9 and inner piston 11 and serves as a primary hydraulic fluid pressure chamber in the first hydraulic circuit of the braking system. A second chamber 14 is defined between the partition wall 9 and outer piston 12 and serves as a secondary hydraulic fluid pressure chamber in the first hydraulic circuit. Chamber 14 is connected by a fluid line 18 to a hydraulic fluid chamber 20 in a brake wheel cylinder 19 associated with the right, front wheel of the vehicle and via a hydraulic fluid pressure control valve 21 to a fluid line 22 leading to a hydraulic fluid chamber 24 in a brake wheel cylinder 23 associated with the left, rear wheel of the vehicle. A release fluid chamber 15, defined as a space between the piston 12 and adjacent end wall member 8, is connected through a fluid line 25 to the reservoir 3. Similarly, chamber 6' defined between the partition wall 9' and inner piston 11' serves as a primary hydraulic fluid pressure chamber in the second hydraulic circuit of the braking system and chamber 14', defined between the partition wall 9' and outer piston 12', serves as a secondary hydraulic fluid pressure chamber in the second hydraulic circuit. Chamber 14' is connected by a fluid line 18' to a hydraulic fluid chamber 20' in a brake wheel cylinder 19' associated with the left, front wheel and via a brake fluid pressure control valve 21' to a fluid line 22' leading to a hydraulic fluid chamber 24' in a brake wheel cylinder 23' associated with the right, rear wheel. A release fluid chamber 15', defined as a space between the outer piston 12' and adjacent end wall member 8' is connected through the fluid line 25 to the reservoir 3. Defined in the cylinder 7 between the inner pistons 11 and 11' is an antilock control fluid pressure chamber 13 which is supplied with and from which antilock control fluid is discharged under the control of supply valve 26 and discharge valve 27 respectively. The valves 26 and 27 are operatively associated with each other so that when one is open, the other is closed and vice-versa.

Compression springs 16, 17 and 17' are mounted in the cylinder 7 respectively between the inner pistons 11 and 11', between the partition wall 9 and piston 11 and between the partition wall 9 and piston 11'. The pistons 11, 12 and 11', 12' are slidable under the combined effect of compression springs 16, 17 and 17' in the cylinder 7 and are each resiliently held in an appropriate axial position as long as the system is at rest.

The fluid pressure control valves 21 and 21' adjust the secondary hydraulic fluid pressure developing after the start of a braking operation in a manner such that the braking forces applied to the rear wheels carrying a lighter load than the front wheels are smaller than those applied to the front wheels in accordance with the load distribution between the front and rear wheels. In other words, under the effect of the fluid pressure control valves 21 and 21', for example, in the form of pressure-reducing or load-responsive valves, the brake fluid pressure in the rear wheel cylinders 23, 23' after the start of a braking operation is lower than that in the front wheel cylinders 19, 19' in accordance with the load distribution between the front and rear wheels of the vehicle.

Description will next be made of the antilock control circuit in the braking system illustrated.

Referring to FIG. 1, control fluid pressurized at a fluid pressure source P, for example, in the form of a plunger pump, is fed to supply control valve 26 through a nonreturn valve 28 and a fluid line 30 containing an accumulator 29. On the other hand, control fluid as discharged by discharge control valve 27 is directed through a fluid line 31 to a reservoir 32 and after passing through a filter 33, is directed from the reservoir 32 through a fluid line 34 and a nonreturn valve 35 back into the fluid pressure source P to be pressurized again therein.

Referring next to FIG. 2, description will be made of valve-controlling means for the supply and discharge control valves 26 and 27 in the antilock system.

Reference numerals 36 and 36' indicate wheel speed sensors for the right and left front wheels, which produce wheel speed signals proportional to the circumferential speeds of the respective front wheels. The sensor output signals are both directed to a higher-speed-signal selector 37, for example, in the form of a so-called high select circuit, which selects the wheel speed signal coming from one of the front wheels rotating at a higher circumferential speed than the other front wheel to pass such signal to a control circuit 38. The control circuit 38 calculates the rate of slip and change in speed of that front wheel which has higher circumferential speed than the other front wheel and normally holds the supply valve 26 closed and the discharge valve 27 open. However, as soon as the front wheel which is rotating with the higher circumferential speed (and thus expected to indicate incipient wheel slip at an instant later than the other front wheel would) indicates incipient wheel slip the control circuit 38 acts to open the supply valve 26 while at the same time closing the discharge valve 27 so that control fluid from the fluid pressure source P is fed into the antilock control fluid pressure chamber 13 in the cylinder 7.

The valves 26 and 27 may both be formed as electromagnetically operated valves; namely, the control valve 26 may be a normally closed solenoid valve which is opened when its solenoid is energized and the control valve 27 a normally open solenoid valve which is closed when its solenoid is energized.

In operation of the braking system constructed as described, the hydraulic fluid pressure developing in the brake master cylinder 1 upon depression of the brake pedal 2 is transmitted through fluid lines 4 and 4' to the respective primary hydraulic fluid pressure chambers 6 and 6' in the hydraulic fluid pressure regulating unit 5. As a result, the pistons 11, 11' are pushed toward each other together with the respective rods 10, 10' and pistons 12, 12' thereon so that a secondary hydraulic fluid pressure develops in each of the secondary hydraulic fluid pressure chambers 14 and 14'.

The secondary hydraulic fluid pressures developed in the chambers 14 and 14' are transmitted directly to the front wheel cylinders 19, 19', which exert braking forces on the right and left front wheels, respectively, and through the fluid pressure control valves 21, 21' to the rear wheel cylinders 23 and 23', which exert braking forces on the left and right rear wheels, respectively. The braking forces acting on the rear wheels are less than those on the front wheels since the rear wheel cylinders 23, 23' are fed with the secondary hydraulic fluid pressure as reduced in magnitude by the fluid pressure control valves 21, 21' in accordance with the load distribution between the front and rear wheels.

In the braking operation, when one of the front wheels rotates at a higher circumferential speed than the other front wheel, that is, that front wheel which is expected to indicate incipient wheel slip at an instant later than the other front wheel, has come to indicate incipient wheel slip, the normally closed pressure supply control valve 26 and normaly open discharge control valve 27 are opened and closed, respectively, under the control of control circuit 38 so that control fluid under pressure from fluid pressure source P is admitted to the antilock control fluid pressure chamber 13 to apply a back pressure to push the pair of opposed pistons 11, 11' outwardly away from each other. As a result, the secondary hydraulic fluid pressure in the secondary hydraulic fluid pressure chambers 14 and 14' is reduced and hence the brake forces of wheel cylinders 19, 19', 23 and 23' acting on the respective wheels of the vehicle are relieved or nullified all at the same time and held so reduced until at least one of the front wheels deases to indicate incipient wheel slip. In the meantime, fluid in the fluid chambers 15, 15' is forced back to the reservoir 3 through fluid line 25 under the drive of outer pistons 12, 12'.

In summary, according to the present invention, the braking system is provided with fluid pressure control valve means 21, 21' to control the ratio of brake fluid pressures transmitted to the front and rear wheel cylinders 19, 19' and 23, 23' respectively in accordance with the load distribution between the front and rear wheels of the vehicle and is thus capable of having brake forces distributed between the front and rear wheels in accordance with the load distribution therebetween, ensuring that the front and rear wheels when braked come to indicate incipient wheel slip at substantially the same time, i.e., at instants minimally spaced from each other.

In this manner, with the braking system, antilock control is effected satisfactorily for all the four wheels of the vehicle substantially at the same time. In further accordance with the present invention, the antilock braking system is provided with the brake fluid pressure regulating unit 5 which is adapted to suppress or relieve the hydraulic fluid pressures transmitted to the respective brake wheel cylinders on the four wheels of the vehicle all at the same time, in response to the control fluid pressure from the antilock control circuit, when one of the front wheels rotates at a higher circumferential speed than the other front wheel and indicates incipient wheel slip. As will readily be appreciated, with the pressure regulating unit, the braking system is capable of simultaneous antilock control on all the wheels, front and rear, of the vehicle with a rather simple fluid circuit construction.

What is claimed is:

1. A back-pressure type antilock braking system for a four wheeled automotive vehicle having front left and right wheels and rear left and right wheels and a determined load distribution of the vehicle on the front and rear wheels, each wheel having a respective brake cylinder for applying braking pressure to the wheel in response to pressure fluid supplied from a master cylinder, said antilock braking system comprising: a hydraulic circuit arrangement for supplying pressure fluid from said master cylinder to said front and rear wheels; fluid pressure control valve means disposed in said hydraulic circuit arrangement at a portion thereof leading to the brake cylinders of said rear left and right wheels and receiving pressure fluid from the master cylinder for controlling the supply of pressure fluid to the brake cylinders of the rear left and right wheels in accordance with the load distribution of the vehicle on the wheels whereby all the front and rear wheels normally undergo incipient wheel slip at substantially the same time; and fluid pressure regulating means interposed in said hydraulic circuit arrangement upstream of said fluid pressure control valve means for relieving the fluid pressures transmitted to the respective brake cylinders associated with the four wheels of the vehicle when one of the two front wheels rotates at a higher circumferential speed than the other front wheel and indicates incipient wheel slip, said fluid pressure regulating means comprising a second source of fluid pressure and a single regulating unit for receiving pressure fluid from the master cylinder, said regulating unit including a cylinder having opposite closed ends, and a pair of pistons slidably mounted in said cylinder to define first and second, secondary hydraulic fluid chambers in said cylinder at respective sides of said pistons remote from the opposite piston, said first, secondary hydraulic fluid chamber being connected to supply fluid pressure to one of said front wheels and one of said rear wheels while said second, secondary hydraulic fluid chamber is connected to supply fluid pressure to the other of said front wheels and the other of said rear wheels, and an antilock control fluid pressure chamber defined in said cylinder between said pair of pistons and connected to said second source of fluid pressure, said antilock control fluid pressure chamber receiving fluid pressure from said second source of pressure to apply the same as a back pressure against said pair of pistons thereby to relieve the fluid pressures transmitted from the secondary hydraulic fluid chambers to the front and rear wheels all at the same time.

2. An antilock braking system as claimed in claim 1, wherein said hydraulic circuit arrangement comprises a dual hydraulic circuit arrangement including a first hydraulic circuit for supplying pressure fluid from said master cylinder to one of the two wheel cylinders and one of the two rear wheel cylinders and a second hydraulic circuit for supplying pressure fluid to the other front wheel cylinder and the other rear wheel cylinder, said fluid pressure control valve means including a pair of fluid pressure control valves respectively in said first and second hydraulic circuits.

3. An antilock braking system as claimed in claim 2 wherein said fluid pressure regulating means comprises second valve means for controlling flow of pressure fluid from said second source of pressure fluid to and from said regulating unit for controlling the fluid pressures transmitted to said brake cylinders.

4. An antilock braking system as claimed in claim 3 comprising a third hydraulic circuit including said antilock control fluid pressure chamber, said second source of fluid pressure and said second valve means, said second valve means having one state in which pressure fluid from said second source of pressure does not flow to said antilock control fluid pressure chamber but is free to flow from said chamber whereby said first and second secondary hydraulic fluid pressure chambers can freely contract and a second state in which pressure fluid from said second source of pressure flows to said antilock control fluid pressure chamber to expand said first and second secondary chambers.

5. An antilock braking system as claimed in claim 4 wherein said valve means in said third circuit includes a first valve having a normally closed state and a second valve having a normally open state, said first valve controlling flow of pressure fluid from said second source to said antilock control fluid pressure chamber, said second valve controlling flow of pressure fluid from said antilock control fluid pressure chamber back to said second source; the first valve being opened when the second valve is closed, and a control circuit for operating said first and second valves.

6. An antilock braking system as claimed in claim 5 wherein said control circuit includes first and second sensor means for respectively sensing speed of rotation of said left and right front wheels, selector means connected to said first and second sensor means for selecting the signal therefrom indicating higher speed of wheel rotation and means for operating said first and second valves when the selected wheel speed indicates incipient wheel slip of the respective wheel.

7. An antilock braking system as claimed in claim 3 wherein said regulating unit comprises partition walls facing respective pistons on sides thereof remote from said antilock control fluid pressure chamber, and a second pair of pistons spaced from respective partition walls to define said secondary hydraulic fluid pressure chambers therewith, and rod means coupling said first and second pistons for respective common displacement.

8. An antilock braking system as claimed in claim 7 wherein said regulating unit further comprises first spring means engaging the first said pistons for opposing displacement towards one another, and second spring means opposing movement of said first pistons towards their respective partition walls.

9. An antilock braking system as claimed in claim 8 wherein said first pistons and said partition walls define respective primary fluid pressure chambers respectively connected to the master cylinder for receiving pressure fluid therefrom.

* * * * *